Figure 1:
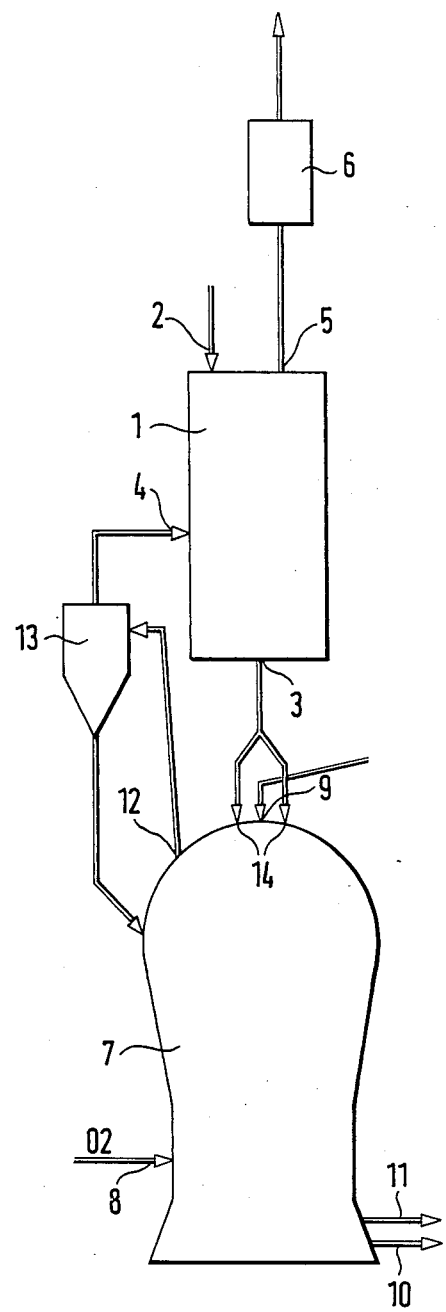

United States Patent [19]

Hauk et al.

[11] Patent Number: 4,846,449
[45] Date of Patent: Jul. 11, 1989

[54] MELTING GASIFIER

[75] Inventors: Rolf Hauk, Düsseldorf; Peter Lang, Meerbusch; Gero Papst, Kaarst, all of Fed. Rep. of Germany

[73] Assignee: Korf Engineering GmbH, Dusseldorf, Fed. Rep. of Germany

[21] Appl. No.: 136,374

[22] Filed: Dec. 22, 1987

[30] Foreign Application Priority Data

Dec. 23, 1986 [DE] Fed. Rep. of Germany ....... 3644776
Nov. 3, 1987 [DE] Fed. Rep. of Germany ....... 3737271

[51] Int. Cl.$^4$ ................................................ C22B 5/14
[52] U.S. Cl. ...................................... 266/172; 432/58
[58] Field of Search ...................... 266/172; 432/15, 58

[56] References Cited

U.S. PATENT DOCUMENTS

| | | | |
|---|---|---|---|
| 2,688,478 | 9/1954 | Lykken | 266/172 |
| 2,756,986 | 7/1956 | Schytil et al. | 266/172 |
| 2,930,604 | 3/1960 | Thornhill | 266/172 |
| 3,713,781 | 1/1973 | Dunn, Jr. | 266/172 |

FOREIGN PATENT DOCUMENTS

| | | | |
|---|---|---|---|
| 114040 | 7/1984 | European Pat. Off. | 266/172 |
| 1474768 | 5/1977 | United Kingdom . | |
| 2068769 | 8/1981 | United Kingdom . | |

*Primary Examiner*—Robert McDowell
*Attorney, Agent, or Firm*—Barnes & Thornburg

[57] ABSTRACT

A novel melting gasifier (7) is disclosed, in which material at least largely comprising metal is melted in a fluidized bed. The latter is maintained by oxygen-containing gas laterally injected through approximately equidistant nozzles in the lower part of the melting gasifier. A carbon carrier and from above the material to be melted are also introduced into the melting gasifier. Over at least part of the fluidized bed height, the gasifier has a horizontal cross-section, which has different dimensions in two directions perpendicular to one another. The nozzles can project by different amounts into the gasifier vessel.

11 Claims, 3 Drawing Sheets

FIG. 2
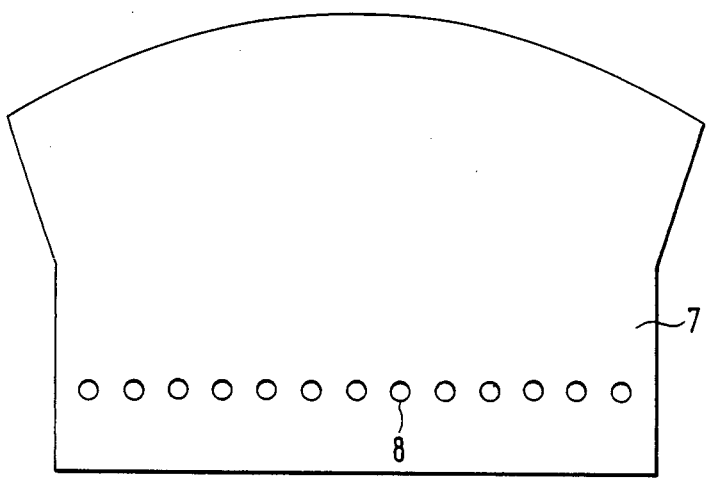
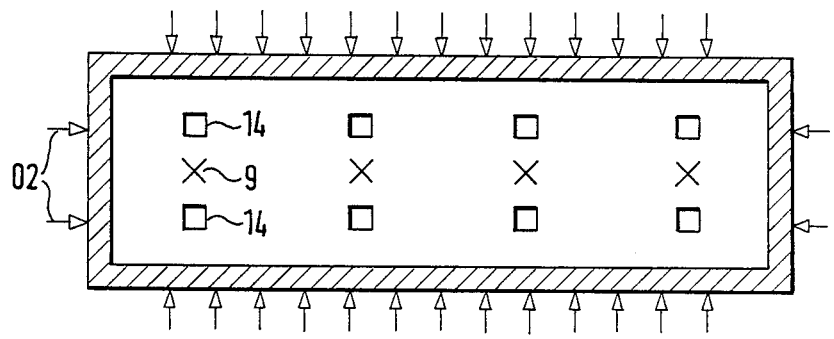
FIG. 3

MELTING GASIFIER

The invention relates to a melting gasifier according to the preamble of claim 1. Such a melting gasifier is e.g. used in the production of molten pig iron. For this purpose it is coupled with a reducing shaft furnace, in which the iron ore is initially reduced to sponge iron by direction reduction. The thus formed sponge iron is then fed from above into the melting gasifier, where it is melted. The carbon carrier used is generally coal, which is also introduced from above into the melting gasifier, whilst the oxygen-containing gas necessary for burning the coal is laterally blown into the lower region, so that it also serves to maintain the fluidized bed. The molton sponge iron is finally reduced, so that at the bottom of the melting gasifier collects molten pig iron and above it molten slag, which can be drawn off at appropriate time intervals.

In the case of a lateral blowing in of oxygen-containing gas, preferably pure oxygen, with a fluidized bed the active melting surface decisive for the melting capacity is determined by the depth by which the gas jet penetrates the fluidized bed. This is due to the fact that, unlike in a static bed, the sponge iron dropping from above onto the fluidized bed is not decelerated to such an extent that it is melted level with the fluidized bed, in which the rising oxygen gas is distributed over the entire cross-sectional surface of the melting gasifier. Thus, the sponge iron is first melted in the vicinity of the injection nozzle plane, where the oxygen gas has not as yet significantly been distributed. Therefore the active melting surface is concentrated on the areas around the nozzles with a radial extension defined by the length of the particular gas jet. This length is limited to approximately 1.5 m, because otherwise the injection rate would have to be excessively increased. In the case of a too high gas velocity, too many very fine particles are formed (jet mill effect).

As the diameter of the melting gasifier always having a circular cross-section is normally larger than corresponds to the sum of the penetration depths of two gas jets, the active melting surface is smaller than the cross-sectional surface of the melting gasifier in the nozzle plane. The larger the requisite melting capacity, the greater must be the diameter of the melting gasifier and the smaller must be the ratio of the active melting surface to the total cross-sectional surface. Recently melting capacities of approximately one million tonnes per year have been required, which needs an active melting surface of the melting gasifier of approximately 60 $m^2$. In the case of conventional gasifiers, this involves a free cross-sectional surface of approximately 110 $m^2$. A gasifier of this size is uneconomic and also leads to technical problems.

The problem of the present invention is therefore to improve the known melting gasifier in such a way, that even in the case of high melting capacities the ratio of active melting surfaces to total cross-sectional surface is very high and almost corresponds to the value 1.

According to the invention this problem is solved by the characterizing feature of claim 1. Another advantageous solution of the problem is provided by the characterizing part of claim 1. Advantageous further developments of the inventive melting gasifier can be gathered from the subclaims.

The invention is characterized in that the melting gasifier has a horizontal cross-section over part of the height of the fluidized bed and this has different dimensions in two directions perpendicular to one another. As a result of this melting gasifier configuration, in the case of a corresponding arrangement of the injection nozzles for the oxygen-containing gas, it is possible to ensure that each point of the cross sectional surface of the nozzle plane is in the vicinity of an injected gas jet, so that the entire cross-sectional surface constitutes an active melting surface.

Preferred cross-sectional surfaces or areas have an oval or rectangular shape. The rectangular shape is particularly advantageous, because it offers the possibility of building up the entire melting gasifier from parallelepipedic bricks. Thus, for the entire gasifier, it is possible to use bricks of the same shape and size and as a result of this simple shape the bricks can be very inexpensively manufactured.

In order to be able to construct the entire cross-sectional surface as an active melting surface, the shorter cross-sectional dimension is approximately between 3 and 5 m. For melting gasifiers with the normally required melting capacities a ratio of the dimensions of the cross sectional surface in the two directions perpendicular to one another is in the range approximately 2:1 to 5:1.

The invention is described in greater detail hereinafter relative to embodiments represented in the attached drawings, wherein show:

FIG. 1 A diagrammatic representation of an iron ore reduction plane, in which iron ore is converted into molten pig iron.

FIG. 2 A side view of the melting gasifier used in the plane according to FIG. 1.

FIG. 3 A plan view of a horizontal section level with the fluidized bed on the melting gasifier according to FIG. 1.

Figure 4:
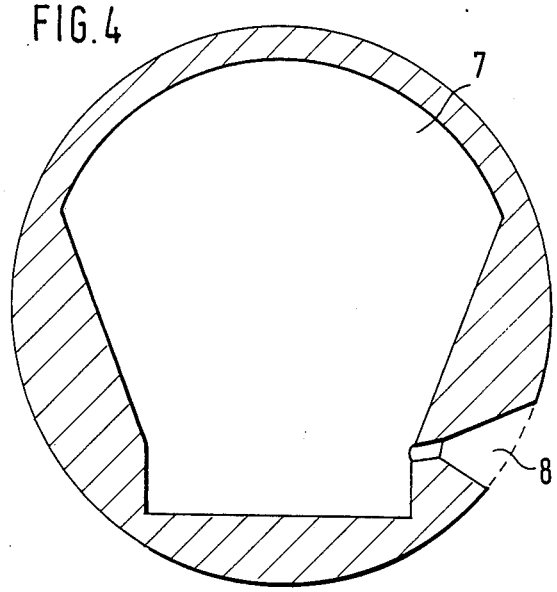

FIG. 4 A side view of a gasifier vessel which is oval or shaped like a horizontal cylinder.

Figure 5:
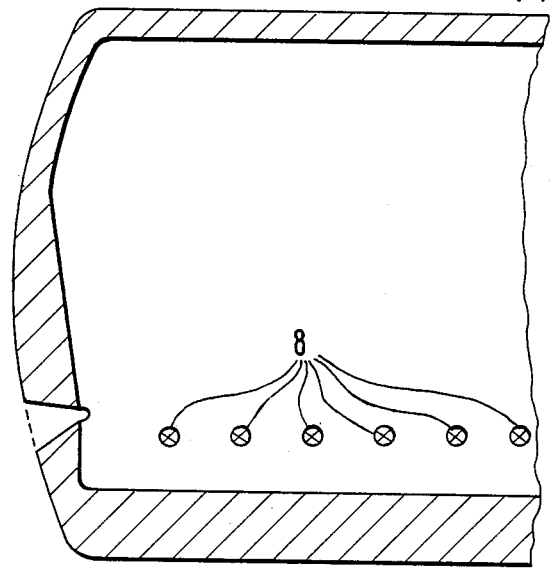

FIG. 5 A part longitudinal section through the gasifier vessel of FIG. 4.

Figure 6:
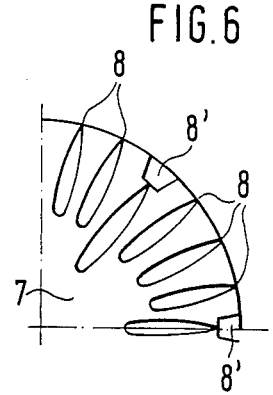

FIG. 6 A diagrammatic partial view of an arrangement within a cross-sectionally circular gasifier vessel in the nozzle plane, only a quadrant being shown.

Figure 7:
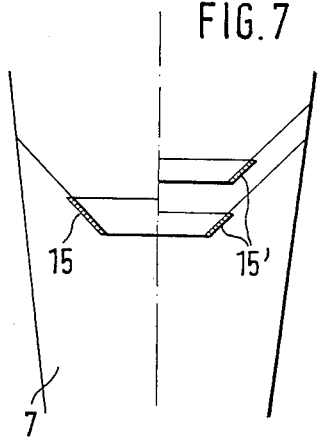

FIG. 7 Two diagrammatic partial views of possible ring inserts within the gasifier vessel above the fluidized bed.

A charging mechanism 2 feeds iron ore and any fluxes into a reducing shaft furnace 1. Sponge iron produced by the reduction of the iron ore is discharged via a bottom outlet part 3. For performing the reduction, reducing gas is supplied via inlet ports 4 on the so-called bustle plane to the reducing shaft furnace 1, said gas flowing upwards counter to the oxidic iron ore dropping in furnace 1 and thereby reduces the same by direct reduction to sponge iron. The reducing gas contains reducing components, such as CO and $H_2$. It also has an appropriate reducing temperature, which is in the range 750° to 950° C.

The spent reducing gas is drawn off as blast furnace gas through an upper outlet port 5 of the reducing shaft furnace 1 and is cleaned in a washer 6, whilst optionally also being freed from $CO_2$, before being reused in an appropriate manner, whereby it is preferably returned to the reducing shaft furnace 1 by a line leading via an outlet port 12 to a cyclone 13. A further part can be returned directly to melting gasifier 7 without any prior $CO_2$ removal.

The sponge iron passes via branching downcomers out of the reducing shaft furnace 1 into a melting gasifier 7. It drops from above into a fluidized bed, which is maintained by oxygen-containing gas injected via inlet ports 8 in the lower region of melting gasifier 7. A solid carbon carrier in the form of coal or coke is fed from above via filling ports 9 into melting gasifier 7.

Through the combustion of the coal or coke under the action of the oxygen-containing gas sufficient heat is produced in the fluidized bed to ensure the melting of the sponge iron. In the molten state, it is completely reduced by the carbon, so that a pig iron melt collects on the bottom of melting gasifier 7 and above it collects a molten slag. These two melts are drawn off at predetermined time intervals via outlet ports 10 and 11 arranged at different heights.

During the combustion of the coal or coke in melting gasifier 7, reducing constituents are formed, preferably CO-containing hot gas, which is led out via an outlet port 12 in the top of the melting gasifier 7 and is cleaned in a cyclone 13 before being fed as reducing gas, optionally accompanied the admixing of the cooler prepared blast furnace gas via inlet ports 4 into the reducing shaft furnace 1. The solids separated from the gas in cyclone 13 are preferably returned to melting gasifier 7 level with the fluidized bed.

In the direction perpendicular to the drawing plane of FIG. 1, melting gasifier 7 has the shape shown in FIG. 2. It can be gathered from FIG. 3 that the gasifier has a rectangular cross-section below the head space. The internal dimensions of this rectangle should in the present case be 15 m and 4 m, which gives a free cross-sectional area of 60 m² which, as will be explained hereinafter, can be substantially completely used as an active melting surface. The represented melting gasifier 7 consequently has an annual melting capacity of approximately one million tonnes.

The shorter cross-sectional dimension is chosen in such a way that a gas jet blown in from one longitudinal side extends over half of said dimension. Therefore said dimension is preferably between 3 and 5 m. The dimension in the longitudinal direction is then substantially dependent on the requisite melting capacity of the gasifier. For standard melting capacities it is approximately 2 to 5 times the dimension in the direction perpendicular thereto.

During the operation of the gasifier, a pressure between approximately 2 and 8 bar prevails therein. The velocities of the injected gas jets required for obtaining the necessary penetration depth are then approximately 100 to 200 m/s.

The reciprocal spacing of the inlet ports 8 or nozzles is a function of to what extent the active melting area is formed around a nozzle perpendicular to the direction of the gas jet. In order to obtain melting surfaces passing into one another, the nozzles must be arranged with reciprocal spacings between approximately 0.5 and 2 m. In the present embodiment inlet ports 8 are provided on one longitudinal side 14. In the case of a length of the melting gasifier 7 of 15 m, the distance between adjacent inlet ports 8 is in each case 1 m. In the direction perpendicular thereto, the extension of the melting gasifier 7 is 4 m and two inlet ports 8 are provided on either side. Thus, in this case a somewhat larger spacing is chosen. For ease of understanding purposes, FIG. 2 only shows the inlet ports 8 of melting gasifier 7, which are indicated in FIG. 3 by arrows directed at the outer wall of gasifier 7.

In order to ensure a uniform distribution of the sponge iron and coal or coke in melting gasifier 7, a plurality of filling ports are provided for the same in the longitudinal direction of the gasifier. FIG. 3 shows the position of four filling ports 9 for the coal or coke and two rows of in each case four filling ports 14 for the sponge iron. As can be seen in FIG. 1, these ports are located in the top or head of melting gasifier 7.

It is advantageous to orient the inlet ports 8 or the associated nozzles in such a way that they are downwardly inclined by an angle between 0° and 30° in the melting gasifier 7. As a result a uniform distribution of the injected oxygen-containing gas is obtained at a lower level than in the case of horizontal injection. The height of the fluidized bed and consequently the complete melting gasifier 7 can in this way be reduced.

The construction of the fluidized bed can be assisted in that the inlet ports 8 for the oxygen-containing gas are arranged in two superimposed horizontal planes. As a function of the size of melting gasifier 7, the distance between these two planes can be between approximately 0.5 and 2 m.

FIGS. 4 and 5 show in cross-section and part longitudinal section an embodiment of a gasifier vessel comprising a horizontal cylinder with convex, lateral end plates. This vessel can be lined with refractory material in such a way that the gasifier vessel side walls have the cross-sectional form shown in FIG. 4. An advantageous cylinder diameter is approximately 12 m and there is a vertical clearance over the nozzle plane of approximately 8 m, when taking account of this type of lining and a distance of the nozzle plane above the gasifier bottom of 2 m. In this embodiment there is a nozzle plane comprising only nozzles 8, which are juxtaposed and spaced in the manner described hereinbefore for the rectangular cross-sectional form.

A subsidiary inventive solution to that of FIGS. 1 to 5 is diagrammatically shown in FIG. 6, which is a cross-section through a circular gasifier vessel in the nozzle plane, only a quadrant of the melting gasifier 7 being shown. Nozzles 8, 8', which are preferably equidistantly located in the nozzle plane being guided through the gasifier vessel wall are constructed in such a way that, apart from the conventionally constructed nozzles 8, there are nozzles 8', which project out of the plane of the refractory material for lining the vessel through extended nozzle connections enabling them to be introduced further into the melting vessel than the other nozzles. The nozzle extension can be between 30 and 100 cm, so that under otherwise identical conditions of pressure and gas supply the blast action supplied to the fluidized bed from these extended nozzles 8' has an extended penetration depth towards the gasifier centre. For the cross-sectionally circular gasifier vessels, there are improvements to the penetration depth of up to 15% more than that conventionally obtained. The relationship between the active fluidized bed maintained by nozzles 8 and 8' with respect to the central, dead area can be improved by 20 to 60% with this arrangement. The different penetration depth of the nozzle effects also lead to an improved and homogenized distribution of the fluidized bed over the cross-section thereof.

The reciprocal inclination angles of the nozzles can vary within the cross-sectional surface by ±15°, as a function of the desired fluidized bed construction.

Such a finite penetration depth improvement of the fluidized bed nozzles is e.g. particularly advantageous in the case of circular gasifier vessels with an annual capacity of 0.3 to 0.8 million tonnes. The arrangement of extended nozzles 8' with respect to conventional nozzles 8 is, however, independent of the cross-sectional shape of the gasifier and it is also conceivable that such arrangements could be advantageous for oval gasifier shapes or other cross-sectional shapes. Due to the fact that only every third to seventh nozzle 8' is extended in the described manner between nozzles 8 and within a nozzle plane, account is taken of the reduction of the radial distance with respect to the centre of the gasifier vessel in an advantageous manner. This also ensures that the individual jets do not come too close to one another, which would lead to instability of the fluidized bed. The extended nozzles projecting into the gasifier vessel must be particularly intensely cooled and completely incorporated into the refractory material. Since in the case of the nozzles 8' introduced into the melting vessel, the fluidized bed material sucked in to the nozzle jet is not directly led out of the wall vicinity, it can be assumed that the solid movement above the projecting, refractory material-lined nozzles is extremely small.

Finally, FIG. 7 shows two examples for introducing ring inserts in the inner area of the melting vessel. The aforementioned melting gasifiers are in particular characterized by an advantageously reduced vessel height, but special stabilization measures are required with respect to the stabilization of the fluidized bed maintained by nozzles 8, 8', particularly to hold back solid material moved too far upwards out of the fluidized bed.

FIG. 7 shows in a diagrammatic sectional representation on the left-hand side half of the inner area of a melting vessel in which is hung a ring insert 15, whilst the right-hand half of the representation shows two superimposed narrower ring inserts 15'. Ring inserts 15, 15' form sloping guide surfaces passing radially inwards to radially outwards and which largely prevent so-called fountain formations within the fluidized bed. Ring inserts 15, 15', which can obviously also be positioned radially differently with respect to one another within the melting vessel, or can comprise more than two ring inserts, hold back the optionally upwardly rising solid particles are precisely those points where the said fountain formations most frequently occur within the melting gasifier. With regards to the arrangement and construction of the ring inserts, it must be ensured that the projection surface thereof, based on the gasifier cross-section, is not too large, so that the gas velocity is not excessively increased by them in the vicinity thereof, because otherwise disadvantages could occur. Ring inserts 15, 15' could also be replaced by other baffle or deflecting plates or the like hung or otherwise fixed to the melting gasifier walls.

We claim:

1. An apparatus for melting metal comprising
   a chamber having having an upper portion and a lower portion, the lower portion including a plurality of nozzles for laterally injecting an oxygen carrying gas into the chamber, the nozzles being approximately equidistantly spaced around the chamber;
   means for introducing metal to be melted and a carbon carrier into the upper portion of the chamber; and
   means for feeding the oxygen carrying gas through the plurality of nozzles at a pressure and velocity such that the metal to be melted and the carbon carrier are suspended in the chamber as a fluidized bed;
   at least the lower portion of the chamber including the plurality of nozzles being configured to have in horizontal cross-section different dimensions in two directions perpendicular to one another.

2. The apparatus of claim 1 wherein the distance between any adjacent pair of the nozzles is between about 0.5 and 1.5 meters.

3. The apparatus of claim 1 wherein the shorter of said two different dimensions is between about 3 to 5 meters.

4. The apparatus of claim 1 wherein the ratio of said different dimensions is between about 2:1 and 5:1.

5. The apparatus of claim 1 wherein the means for feeding the oxygen carrying gas injects the gas at a gas velocity between about 100 and 200 meters/second.

6. The apparatus of claim 1 wherein the horizontal cross-section of the lower portion has a rectangular perimeter.

7. The apparatus of claim 1 wherein the horizontal cross-section of the lower portion has an oval perimeter.

8. The apparatus of claim 1 wherein one of between every third and seventh nozzle extends into the chamber.

9. The apparatus of claim 1 wherein at least one ring insert is positioned within the chamber above the nozzles.

10. An apparatus for melting metal comprising
    a chamber having having an upper portion and a lower portion, the lower portion including a plurality of nozzles for laterally injecting an oxygen carrying gas into the chamber, the nozzles being approximately equidistantly spaced around the chamber;
    means for introducing metal to be melted and a carbon carrier into the upper portion of the chamber;
    a hot gas outlet port in the upper portion of the chamber for permitting the escape of hot CO containing gas from the chamber;
    means for feeding the oxygen carrying gas through the plurality of nozzles at a pressure and velocity such that the metal to be melted and the carbon carrier are suspended in the chamber as a fluidized bed; and
    outlet port means situated below the plurality of nozzles for withdrawing melted metal and slag from the chamber;
    at least the lower portion of the chamber including the plurality of nozzles being configured to have in horizontal cross-section different dimensions in two directions perpendicular to one another;
    the shorter of the dimensions being such that the oxygen containing gas introduced through a nozzle arranged parallel to the shorter dimension extends over about half of the dimension; and
    the longer of the dimensions being from between about 2 to about 5 times the shorter dimension.

11. An apparatus for melting metal comprising
    a chamber having having an upper portion and a lower portion, the lower portion including a plurality of nozzles for laterally injecting an oxygen carrying gas into the chamber, the nozzles being approximately equidistantly spaced by between about 0.5 and 2.0 m around the chamber;

means for introducing metal to be melted and a carbon carrier into the upper portion of the chamber in a generally uniform distribution;

a hot gas outlet port in the upper portion of the chamber for permitting the escape of hot CO containing gas from the chamber and means for separating entrained solids from the hot CO containing gas;

means for feeding the oxygen carrying gas through the plurality of nozzles at a velocity of between about 100 and 200 m/sec and in an amount such that the metal to be melted and the carbon carrier are suspended in the chamber as a fluidized bed; and outlet port means situated below the plurality of nozzles for withdrawing melted metal and slag from the chamber;

at least the lower portion of the chamber including the plurality of nozzles being configured to have in horizontal cross-section different dimensions in two directions perpendicular to one another;

the shorter of the dimensions being between about 3 and 5 meters and the longer of the dimensions being from between about 2 to about 5 times the shorter dimension.

* * * * *